United States Patent
Zhang et al.

(10) Patent No.: US 11,733,425 B1
(45) Date of Patent: Aug. 22, 2023

(54) FULL WELLBORE PRESSURE CALCULATION METHOD, DEVICE AND COMPUTER READABLE STORAGE MEDIUM FOR FRACTURING HORIZONTAL WELL

(71) Applicant: Southwest Petroleum University, Chengdu (CN)

(72) Inventors: Ruihan Zhang, Chengdu (CN); Yulong Zhao, Chengdu (CN); Jian Zheng, Chengdu (CN); Hongsha Xiao, Chengdu (CN); Deliang Zhang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/890,248

(22) Filed: Aug. 17, 2022

(30) Foreign Application Priority Data

Feb. 22, 2022 (CN) .......................... 202210160050.0

(51) Int. Cl.
*G01V 99/00* (2009.01)
*G06F 30/28* (2020.01)
*G06F 113/08* (2020.01)

(52) U.S. Cl.
CPC ............ *G01V 99/005* (2013.01); *G06F 30/28* (2020.01); *G06F 2113/08* (2020.01)

(58) Field of Classification Search
CPC .... G01V 99/005; G06F 30/28; G06F 2113/08
See application file for complete search history.

(56) References Cited

U.S. PATENT DOCUMENTS 10,689,972 B1   6/2020 Zhao et al.

FOREIGN PATENT DOCUMENTS

| CA | 3037543 A1 | 9/2019 |
|---|---|---|
| CN | 105840187 A | 8/2016 |

(Continued)

OTHER PUBLICATIONS

Jia Deng, et al., "A new seepage model for shale gas reservoir and productivity analysis of fractured well," Fuel Journal 124, p. 232-240 (Year: 2014).*

(Continued)

*Primary Examiner* — Steven W Crabb

(57) ABSTRACT

The invention discloses a full wellbore pressure calculation method, device and computer-readable storage medium for fracturing horizontal wells, includes steps: collect basic parameters, establish fully implicit numerical model of formation flow; solve the full implicit numerical model under an inner boundary condition of a constant gas production rate; calculate wellbore pressure change of each fracturing section of horizontal well; calculate the bottom-hole pressure of each fracture initiation point; repeat steps until the variables converge, the bottom-hole flow pressure and the bottom-hole pressure at each fracture initiation point are obtained at this time step; the wellbore pressure and wellhead casing pressure are calculated at this time step. The method is for predicting the variation law of full wellbore pressure and wellhead casing pressure by using production data in the absence of bottom-hole pressure test data, and has practical value for accurate prediction of production performance of gas reservoir fracturing horizontal wells.

5 Claims, 7 Drawing Sheets

(56) References Cited

FOREIGN PATENT DOCUMENTS

| | | |
|---|---|---|
| CN | 107622328 A | 1/2018 |
| CN | 109025942 A | 12/2018 |
| CN | 113076676 A | 7/2021 |

OTHER PUBLICATIONS

Jiazheng Qin, et al., "A novel well-testing model to analyze production distribution of multi-stage fractured horizontal well," Journal of Natural Gas Science and Engineering 59, p. 237-249 (Year: 2018).*

Wei Yu, et al., "A Numerical Model for Simulating Pressure Response of Well Interference and Well Performance in Tight Oil Reservoirs With Complex-Fracture Geometries Using the Fast Embedded-Discrete-Fracture-Model Method," SPE Reservoir Evaluation & Engineering p. 489-502 (Year: 2018).*

\* cited by examiner

FULL WELLBORE PRESSURE CALCULATION METHOD, DEVICE AND COMPUTER READABLE STORAGE MEDIUM FOR FRACTURING HORIZONTAL WELL

FIELD OF THE INVENTION

The invention relates to the technical field of numerical simulation of oil and gas reservoirs, in particular to a method, device and computer-readable storage medium for calculating a full wellbore pressure for fracturing horizontal wells.

BACKGROUND OF THE INVENTION

Unconventional shale gas reservoirs, tight gas reservoirs and other original reservoirs generally have low porosity and permeability, and low natural depletion production. In order to obtain industrial production capacity, it is necessary to generate multiple artificial fractures through long horizontal section plus hydraulic fracturing technology to improve the seepage capacity of unconventional reservoirs. In the past research, it is generally believed that the production of each artificial fracture is equal, and the pressure loss in the wellbore is ignored, and the fracturing horizontal well is regarded as having infinite conductivity. However, the actual situation is that due to the heterogeneity of the reservoir and the interference between fractures in the production process, the production of each artificial fracture is not equal. In addition, due to the confluence of reservoir fluid, the flow in the horizontal section of the wellbore belongs to variable-mass multi-phase flow, which will generate frictional pressure drop, gravity pressure drop, and accelerated pressure drop caused by fluid confluence in fractures. The pressure change in the wellbore will in turn affect the fluid confluence of each fracture, resulting in the change of the productivity of each fracture. Therefore, it is necessary to study the coupled formation wellbore flow model of fracturing horizontal wells to achieve accurate prediction of fracture production, reservoir pressure variation and the pressure distribution characteristics of the full wellbore in fracturing horizontal wells.

SUMMARY OF THE INVENTION

In view of the above reasons, the purpose of the present invention is to provide a method for calculating the full wellbore pressure of a fracturing horizontal well. The technical solution of the present invention is as follows.

A method for calculating a full wellbore pressure of a fracturing horizontal well, includes the following steps:

S1, collect wellbore structural parameters, fluid physical properties, reservoir parameters and production history data at different time steps, and establish a fully implicit numerical model of formation flow based on embedded discrete fracture model (EDFM).

S2, solve the formation flow fully implicit numerical model based on the embedded discrete fracture model (EDFM) under an inner boundary condition of a constant gas production rate at a certain time step, and obtain the gas production, liquid production, grid block pressure and initial well bottom flow pressure of each fracture.

S3, bring the gas production volume, liquid production volume and the pressure of the grid block where the fracture initiation point is located into the pressure drop model considering the gravity loss, frictional resistance loss and fracture convergence loss, and obtain the wellbore pressure variation of each fracturing section of the horizontal well.

S4, calculate the well bottom-hole pressure of each fracture initiation point from the initial well bottom-hole flow pressure and the wellbore pressure change of each fracturing section.

S5, bring the bottom-hole flow pressure and the bottom-hole pressure of each fracture initiation point into the formation flow fully implicit numerical model based on the embedded discrete fracture model (EDFM) in the step S2, and iteratively cycle steps S2-S4 until the iterative variables converge, obtain the bottom-hole flow pressure and bottom-hole pressure of each fracture initiation point at this time step.

S6, bring the bottom-hole flow pressure and the total gas production and liquid production at the time step into the pressure drop model considering gravity loss and frictional resistance loss in the inclined section and vertical well section, and obtain each section wellbore pressure and wellhead casing pressure through the iterative cycle step by step.

S7, for each time step, repeat steps S2-S6 to obtain the full wellbore pressure at different production times.

A device for calculating the full wellbore pressure of a fracturing horizontal well, includes a processor, an acquisition module for acquiring initial data for calculating the full wellbore pressure of a fracturing horizontal well, an output module for outputting calculation results, and a storage module; a program for calculating the full wellbore pressure of a fracturing horizontal well that can be run on the processor is stored thereon, and the program for calculating the full wellbore pressure of a fracturing horizontal well is executed by the processor to realize the above-mentioned method steps.

A computer readable storage medium having stored therein program code executable by a processor, the computer readable storage medium including a plurality of instructions configured to cause the processor to perform the described wellbore pressure calculation method of fracturing horizontal well.

Compared with the prior art, the present invention has the following beneficial effects:

1. based on the dual medium-embedded discrete fracture coupling model, a fully implicit numerical model for the seepage flow of fracturing horizontal wells in unconventional tight gas reservoirs and shale gas reservoirs is established, which realizes the accurate characterization of multi-medium flow laws in unconventional gas reservoirs;
2. considering the pressure drop, frictional resistance and gravity pressure drop caused by the mass-varying flow of formation fluid into the wellbore, a wellbore pressure drop model for fracturing horizontal wells in unconventional gas reservoirs with gas-liquid two-phase flow was established, and the wellbore pressure drop model for fracturing horizontal wells in unconventional gas reservoirs was established. The full wellbore pressure distribution characteristics are simulated and predicted, and in the absence of bottom-hole pressure test data, the production data can be used to predict the change law of the whole wellbore pressure and wellhead casing pressure, which saves the test cost and has important practical significance.

DETAILED DESCRIPTION OF PREFERRED EMBODIMENTS

In order to have a clearer understanding of the technical features, purposes and beneficial effects of the present invention, the technical solutions of the present invention are now described in detail below, but should not be construed as limiting the scope of implementation of the present invention. Based on the embodiments of the present invention, all other embodiments obtained by persons of ordinary skill in the art without creative efforts shall fall within the protection scope of the present invention.

Example

Figure 4:
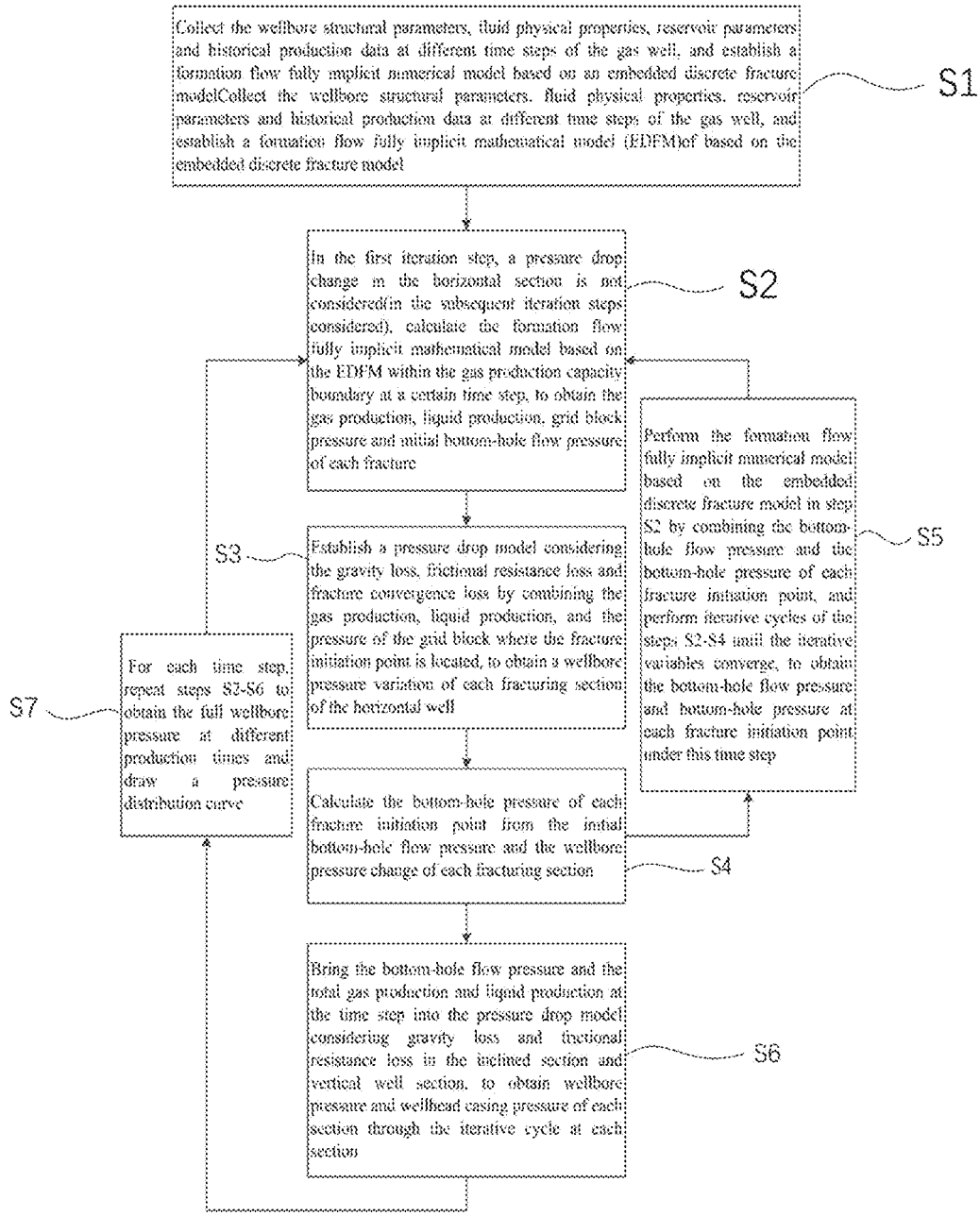
FIG. 4 is a flow chart of the method for calculating the full wellbore pressure of a fracturing horizontal well according to an embodiment of the present invention.
Figure 4A:
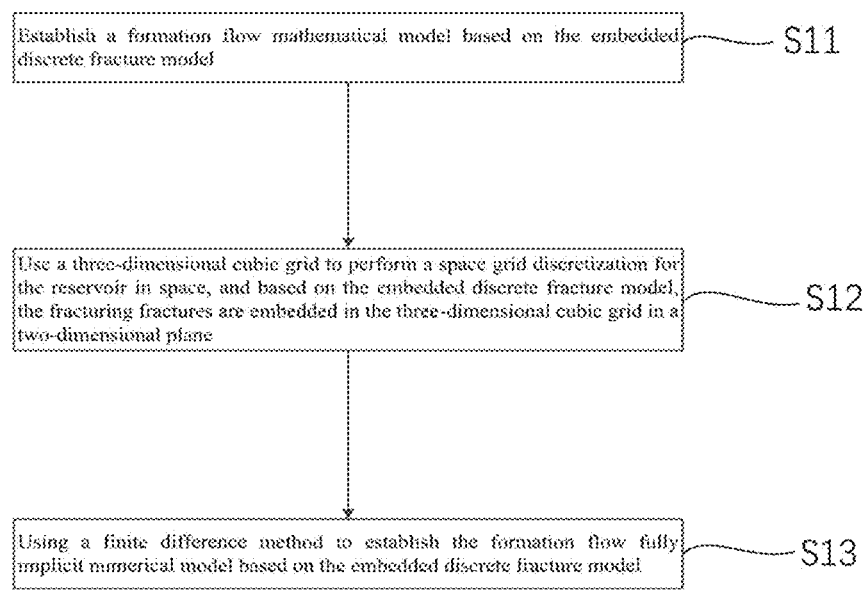
FIG. 4A is a flow chart of establishment of a formation flow fully implicit numerical model according to an embodiment of the present invention.
Figure 4B:
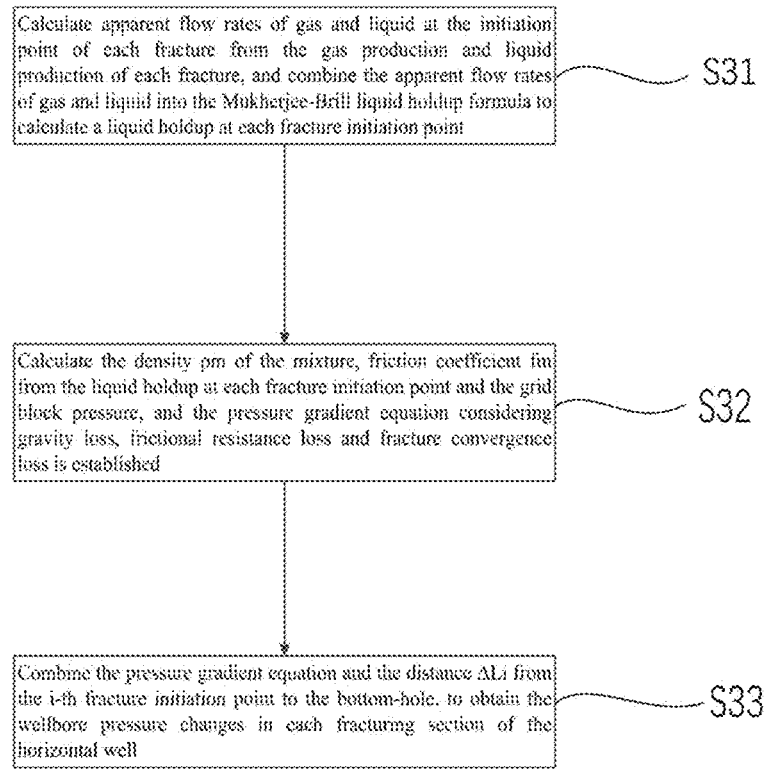
FIG. 4B is a flow chart of obtaining a wellbore pressure variation of each fracturing section of the horizontal well according to an embodiment of the present invention.

To calculate the full wellbore pressure of fracturing horizontal wells, the flow chart of this calculation method can be referred to FIG. 4, including the following steps:

S1, collect wellbore structural parameters, fluid physical properties, reservoir parameters and production history data at different time steps, and establish a fully implicit numerical model of formation flow based on embedded discrete fracture model (EDFM);

This example takes an actual shale gas well as an example, and the specific basic data are as follows:

TABLE 1

Basic data of an actual shale gas well

| Parameter | Numerical value | Parameter | Numerical value |
|---|---|---|---|
| Outer zone volume(m³) | 1400*400*50 | Formation pressure(MPa) | 40 |
| Length of main fracture(m) | 200 | Daily gas production(10,000 cubic meters/day) | 15 |
| Horizontal section length(m) | 1000 | Main fracture permeability(mD) | 500 |
| The number of main fracture | 11 | Micro-fracture permeability(mD) | 0.005 |
| Matrix permeability(mD) | 0.0001 | Matrix porosity | 5% |
| Stress Sensitivity coefficient(MP⁻¹) | 0.1 | Micro-fracture porosity | 1% |
| Sleeve size(m) | 0.1214 | Shape factor(m⁻²) | 0.01 |

The establishment of the formation flow fully implicit numerical model based on the embedded discrete fracture model (EDFM) includes the following steps:

S11, establish a formation flow mathematical model based on the embedded discrete fracture model, use the dual medium model to describe the flow exchange between the matrix and micro-fractures, and use the embedded discrete fracture model to describe the flow exchange between the matrix and artificial fractures, based on the mass conservation equation, the seepage differential equation is established with Darcy's law, and the formation flow mathematical model of the embedded discrete fracture model is as follows:

Matrix system seepage equation:

$$\nabla \cdot \left( \frac{k_m k_{rlm}}{\mu_{lm} B_{lm}} \nabla p_{lm} \right) - q_{l,fm} = \frac{\partial}{\partial t} \left( \frac{\phi_m S_{lm}}{B_{lm}} \right) \quad (1)$$

The seepage equation of the micro-fracture system:

$$\nabla \cdot \left( \frac{k_f k_{rlf}}{\mu_{lf} B_{lf}} \nabla p_{lf} \right) + \sum q_{l,fm} - q_{l,Ff} = \frac{\partial}{\partial t} \left( \frac{\phi_f S_{lf}}{B_{lf}} \right) \quad (2)$$

Seepage equation of artificial fracture system:

$$\sum q_{l,F} + \sum q_{l,FF} + \sum q_{l,Ff} + q_{l,well} = \frac{\partial}{\partial t} \left( \frac{\phi_F S_{lF}}{B_{lF}} \right) \quad (3)$$

The supplementary equation is as follows:

$$q_{l,fm} = \frac{\alpha k_m k_{rlm}}{\mu_{lm} B_{lm}} (p_{lm} - p_{lf}) \quad (4)$$

$$q_{l,F} = G_F \frac{1}{\mu_{lF} B_{lF}} (p_{lf} - p_{lF})$$

$$q_{l,FF} = G_{FF} \frac{1}{\mu_{lF} B_{lF}} (p_{lm} - p_{lf})$$

$$q_{l,Ff} = G_{Ff} \frac{1}{\mu_{lf} B_{lf}} (p_{lf} - p_{lF})$$

$$q_{l,well} = G_{well} \frac{1}{\mu_{lF} B_{lF}} (p_{lF} - p_{wf})$$

Wherein $k_m$ and $k_f$ represent the permeability of matrix, micro-fracture, and artificial fracture system, respectively, the unit is D; $k_{rlm}$ and $k_{rlf}$ represent the relative permeability of matrix, micro-fracture and artificial fracture system, the unit is D, wherein l=g,w; $\mu_{lm}$, $\mu_{lf}$, $\mu_{lF}$ represent the fluid viscosity of matrix, micro-fracture and artificial fracture system, the unit is Pa·s, wherein l=g,w; $B_{lm}$, $B_{lf}$, $B_{lF}$ represent the fluid volume coefficients of the matrix, micro-fracture, and artificial fracture systems, respectively, dimensionless, wherein l=g,w; $\phi_m$, $\phi_f$, $\phi_F$ represent the porosity of the matrix, micro-fractures, and artificial fracture systems, respectively, dimensionless; $S_{lm}$, $S_{lf}$, $S_{lF}$ represent saturation, dimensionless, wherein l=g,w; t represents production time, the unit is day; $p_{lm}$, $p_{lf}$, $p_{lF}$ represent the two-phase pressure of matrix, micro-fracture and artificial fracture system, the unit is MPa, wherein l=g,w; $r_l$ represents the phase density, the unit is kg/m³, wherein l=g,w; G represents the acceleration of gravity, the unit is m/s²; z represents vertical depth, the unit is m; $q_{l,fm}$ represents the flow exchange between matrix and micro-fractures based on the dual medium model, the unit is 1/day, wherein l=g,w; $\alpha$ represents the shape factor between matrix and micro-fractures, the unit is m⁻²; $q_{l,F}$ represents the flow exchange between the grids after an artificial fracture is divided into multiple grids by the matrix grid, the unit is 1/day; $q_{l,FF}$ represents the flow exchange between different artificial fracture grids, the unit is 1/day; $q_{l,Ff}$ represents the flow exchange between the artificial fracture grid and the matrix grid, the unit is 1/day; $q_{l,well}$ represents the flow exchange between the artificial fracture grid and the connected well grid, the unit is 1/day; $G_F$ represents geometric parameters for the connection pairs of grids in the same fracture; $G_{FF}$ represents the geometric parameter of the connection pairs of intersected fracture grids between different fractures; $G_{Ff}$ is the geometric parameter of the connection pair between the matrix grid and intersected fracture grid; $G_{well}$ represents geometric parameters for connected pairs between fracture grid and intersected well grid.

S12, use a three-dimensional cubic grid to discretize the reservoir in space, based on EDFM, the fractures are embedded in the three-dimensional cubic grid in a two-dimensional plane.

S13, use the finite difference method to establish the formation flow fully implicit numerical model based on the embedded discrete fracture model (EDFM), and solve the formation flow fully implicit numerical model; include the following steps:

For the seepage equation (1) of the matrix system, the flow exchange relationship between the matrix grids on the left can be written in the form of flow:

$$\sum q_{,lmm} - q_{l,fm} = \frac{\partial}{\partial t}\left(\frac{\phi_m S_{lm}}{B_{lm}}\right) \quad (5)$$

In the formula: $q_{l,mm}$ represents the flow exchange between connected matrix grids, the unit is 1/day.

The finite difference method is used to derivative expansion of the flow exchange term $\Sigma q_{i,mm} - \Sigma q_{j,mm}$ on the left side of the above seepage equation, if there is flow exchange between i and j grids, the fully implicit iterative form of the flow exchange between the two grids is.

$$q_{lij,mm}^{n+1} = a_{lmi}\delta p_{lmi} + a_{lmj}\delta p_{lmj} + b_{lmi}\delta S_{lmvi} + b_{lmj}\delta S_{lmvj} + d_{imij} \quad (6)$$

In the formula: n+1 represents the next time step; v represents the v-th iteration step; $\delta p_{lmi}$, $\delta p_{lmj}$ represents the iterative pressure variables in the i-th and j-th grids of the matrix system; $a_{lmi}$, $a_{lmj}$ representing coefficients of iterative pressure variables in the i-th and j-th grids of the matrix system; $\delta S_{lmi}$, $\delta S_{lmj}$ represents the iterative saturation variable in the i-th and j-th grids of the matrix system; $b_{lmi}$, $b_{lmj}$ representing coefficients the iterative saturation variables in the i-th and j-th grids of the matrix system; $d_{lmij}$ is the known quantity of flow exchange between the i-th and j-th grids of the matrix system.

The mass accumulation term $$\frac{\partial}{\partial t}\left(\frac{\phi_m S_{lm}}{B_{lm}}\right)$$

on the right side of the above seepage equation also derives and expands the unknowns, the coefficients of the unknowns are added to the coefficient matrix, and the known quantities are brought into the known quantity matrix to obtain:

$$mm \times \delta_m = d_m \quad (7)$$

In the formula: mm represents the coefficient matrix in the matrix flow equation; $\delta_m$ represents the unknown quantity matrix in the matrix flow equation; $d_m$ is the matrix of known quantities in the matrix flow equation. Therefore, the fully implicit solution matrix based on the finite difference method for micro-fractures, artificial fractures, the flow exchange terms of each system and the internal flow of the wellbore can be deduced as follows:

$$\begin{bmatrix} mm & mf & 0 & 0 \\ mf & ff & fF & 0 \\ 0 & fF & FF & Fw \\ 0 & 0 & Fw & ww \end{bmatrix} \begin{bmatrix} \delta m \\ \delta f \\ \delta F \\ \delta w \end{bmatrix} = \begin{bmatrix} d_m \\ d_f \\ d_F \\ d_w \end{bmatrix} \quad (8)$$

Wherein ff, FF, and ww represent the coefficient matrices in the microfractures, artificial fractures, and wellbore flow equations, respectively; mf, fm represent the flow exchange coefficient matrices between the matrix and the microfracture system; fF, Ff represent the microfractures and artificial fractures; Fw represents the flow exchange coefficient matrix between the artificial fracture and the wellbore; $d_f$, $d_F$, $d_w$ represent the known quantity matrices in the microfracture, artificial fracture, and wellbore flow equations, respectively; $\delta f$, $\delta F$, and $\delta w$ represent the unknown quantity matrices in the microfracture, artificial fracture, and wellbore flow equations, respectively.

By solving Equation (8), the gas production and liquid production of each fracture, the grid block pressure where each fracture is located, and the initial bottom-hole flow pressure can be obtained.

S2, solve the formation flow fully implicit numerical model based on the embedded discrete fracture model (EDFM) under an inner boundary condition of a constant gas production rate at a certain time step, and obtain the gas production, liquid production, grid block pressure and initial bottom-hole flow of each fracture; when this step is performed, in the first iteration step, the pressure drop change in the horizontal section is not considered; in the subsequent iteration steps, the pressure drop change in the horizontal section is considered.

S3, bring the gas production, liquid production, and the pressure of the grid block where the fracture initiation point is located into the pressure drop model considering the gravity loss, frictional resistance loss and fracture convergence loss, and obtain the wellbore pressure change of each fracturing section of the horizontal well. Specifically include the following steps:

S31, calculate the apparent flow rate of gas and liquid at the initiation point of each fracture from the gas production and liquid production of each fracture, and bring it into the Mukherjee-Brill (M-B) liquid holdup formula to calculate the liquid holdup at each fracture initiation point:

$$v_{sg} = q_{sc}B_g / A \quad (9)$$
$$v_{sl} = q_w B_w / A$$

Wherein $v_{sl}$ represents the apparent flow rate of the liquid phase, the unit is m/s; $v_{sg}$ represents the apparent flow rate of the gas phase, the unit is m/s; $q_{sc}$ represents the fracture gas production, the unit m³/s; $q_w$ represents the fracture fluid production, the unit is m³/s; $B_g$ represents the volume coefficient of the gas phase, dimensionless; $B_w$ represents the liquid phase volume coefficient, dimensionless; A represents the cross-sectional area of the wellbore, the unit is m².

$$H_l = \exp\left[(c_1 + c_2\sin\theta + c_3\sin^2\theta + c_4 N_l^2)\frac{N_{gv}^{c_5}}{N_{lv}^{c_6}}\right] \quad (10)$$

In the formula: $H_l$ represents the liquid holdup, dimensionless; $c_1=-0.380113; c_2=-0.129875; c_3=-0.119788; c_4=2.343227; c_5=0.475686; c_6=0.288657;$ θ represents the angle between the wellbore and the horizontal direction, the unit is degree (°).

The $N_{lv}$, $N_{gv}$, $N_l$ in the above formula are as follows:

Liquid velocity number: $N_{lv} = v_{sl}\left(\frac{\rho_l}{G\delta}\right)^{1/4}$ (11)

Gas velocity number: $N_{gv} = v_{sg}\left(\frac{\rho_l}{G\delta}\right)^{1/4}$

Liquid viscosity number: $N_l = \mu_l\left(\frac{G}{\rho_l\delta^3}\right)^{1/4}$ In the formula: ρl reprents the liquid density, the unit is kg/m³; δ represents the gas-liquid interfacial tension, the unit is N/m; $\mu_l$ reprents the liquid viscosity, the unit is Pa·s.

S32, calculate the density $\rho_m$ of the mixture, friction coefficient $f_m$ from the liquid holdup at each fracture initiation point and the grid block pressure, and the pressure gradient equation considering gravity loss, frictional resistance loss and fracture convergence loss is established as follows:

$$\frac{dp}{dL} = \rho_m G\sin\theta + f_m\frac{\rho_m v_m^2}{2D} + \rho_m v_m\frac{dv_m}{dL} \quad (12)$$

In the formula: (dp/dL) represents the pressure gradient, the unit is MPa/m; dL represents the length of the horizontal section between adjacent fractures, the unit is m; $\rho_m$ represents the mixed density, the unit is kg/m³; G represents the acceleration of gravity, the unit is m/s²; θ represents the angle between the wellbore and the horizontal direction; $f_m$ represents the two-phase friction coefficient, dimensionless; $v_m$ represents the mixing speed, the unit is m/s; D represents the diameter of the pipe, the unit is m.

S33, combine the pressure gradient equation (12) and the distance $\Delta L_i$ from the i-th fracture initiation point to the bottom-hole (i. e, the first fracture initiation point), the wellbore pressure changes in each fracturing section of the horizontal well are obtained as follows:

$$\Delta p_{wi} = \Delta L_i \cdot \frac{dp}{dL}(i = 2, 3, \ldots N_F) \quad (13)$$

In the formula: $N_F$ represents the total number of the fractures; $\Delta L_i$ represents the distance from the i-th fracture initiation point to the bottom-hole of the well, the unit is m; $\Delta p_{wi}$ represents the horizontal wellbore pressure change from the bottom-hole to the i-th fracture, the unit is MPa.

S4, calculate the bottom-hole pressure of each fracture initiation point from the initial bottom-hole flow pressure and the wellbore pressure change of each fracturing section;

S5, bring the bottom-hole flow pressure and the bottom-hole pressure of each fracture initiation point into the formation flow fully implicit numerical model based on the embedded discrete fracture model (EDFM) in step S2, and iteratively cycle steps S2-S4 until the iterative variables converge, obtain the bottom-hole flow pressure and bottom-hole pressure of each fracture initiation point at this time step;

S6, bring the bottom-hole flow pressure and the total gas production and liquid production at the time step into the pressure drop model considering gravity loss and frictional resistance loss in the inclined section and vertical well section, and obtain the wellbore pressure and wellhead casing pressure of each section through the iterative cycle section by section.

Figure 1:
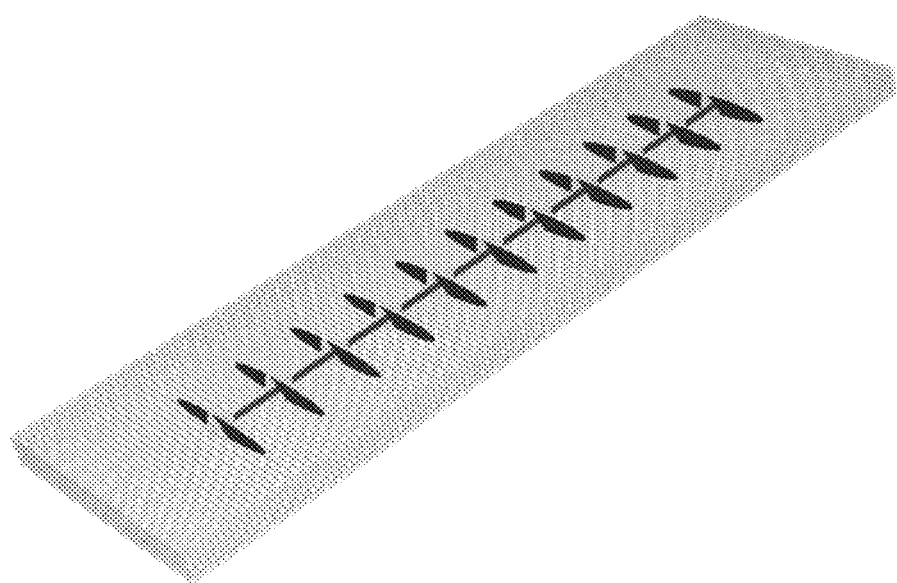
FIG. 1 is a schematic diagram of the discrete spatialgrid of the gas well based on EDFM in the embodiment of the present invention.
Figure 2:
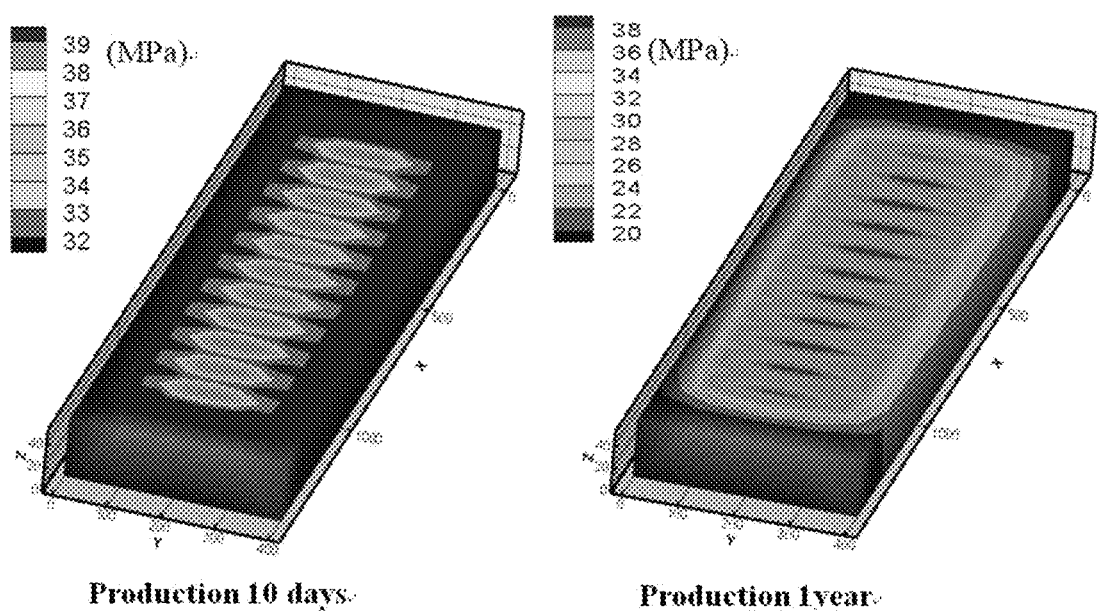
FIG. 2 is reservoir pressure distribution at different production times of the gas well in the embodiment of the present invention.
Figure 3:
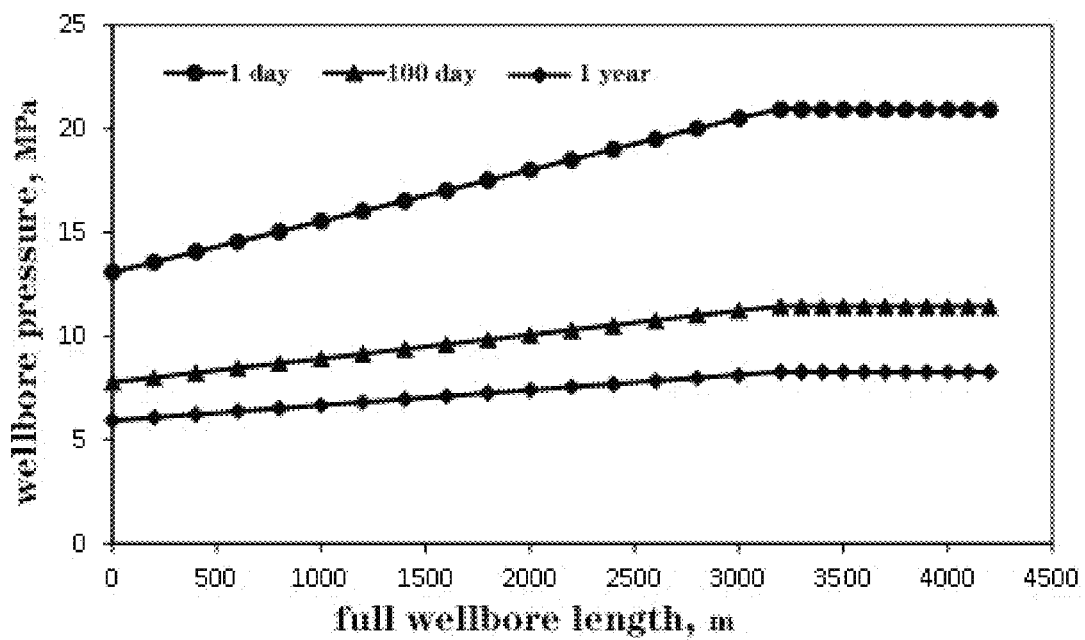
FIG. 3 is the prediction curve of the full wellbore pressure distribution at different production times of the gas well according to the embodiment of the present invention.

S7, for each time step, repeat steps S2-S6 to obtain the full wellbore pressure under different production times and draw a pressure distribution curve. For specific results, see FIG. 2 and FIG. 3.

Figure 5:
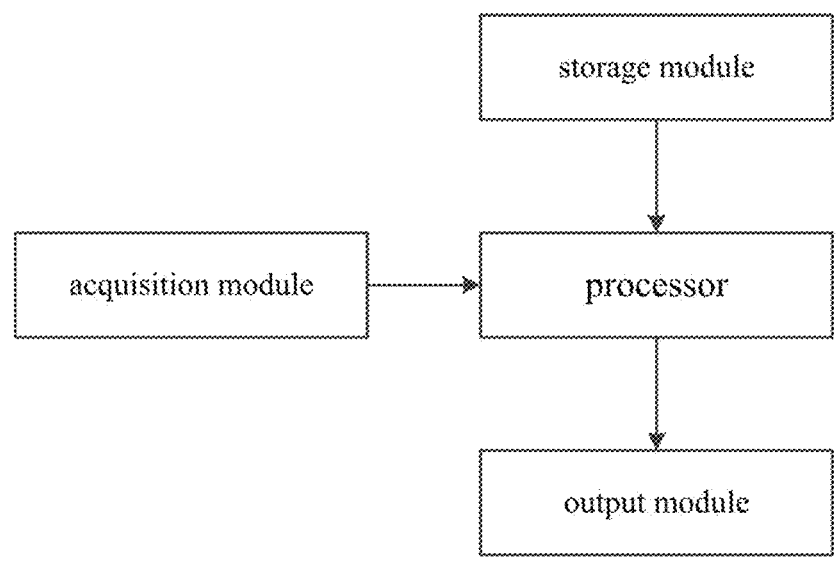
FIG. 5 is a device for calculating the full wellbore pressure of a fracturing horizontal well for the embodiment of the present invention.

Referring to FIG. 5, a device for calculating the full wellbore pressure of a fracturing horizontal well, includes a processor, an acquisition module for acquiring initial data for calculating the full wellbore pressure of a fracturing horizontal well, an output module and a storage module for outputting calculation results; a program for calculating the full wellbore pressure of a fracturing horizontal well is stored on the storage module, which can be run on the processor, and the program for calculating the full wellbore pressure of a fracturing horizontal well is executed by the processor to implement the above method step.

A computer readable storage medium having stored therein program code executable by a processor, the computer readable storage medium including a plurality of instructions configured to cause the processor to perform the described fracturing horizontal well process. wellbore pressure calculation method.

The above is not intended to limit the present invention in any form. Although the present invention has been disclosed through the above-mentioned embodiments, it is not intended to limit the present invention. Any person skilled in the art, within the scope of the technical solution of the present invention, When the technical contents disclosed above can be used to make some changes or modifications to equivalent embodiments with equivalent changes, any simple modifications or equivalents to the above embodiments according to the technical essence of the present invention do not depart from the content of the technical solution of the present invention. Changes and modifications still fall within the scope of the technical solutions of the present invention.

What is claimed is:

1. A method for calculating a full wellbore pressure of a fracturing horizontal well, wherein the method comprises the following steps:

S1, collect the wellbore structural parameters, fluid physical properties, reservoir parameters and historical production data at different time steps of the gas well, and establish a formation flow fully implicit numerical model based on an embedded discrete fracture model;

S2, calculate the formation flow fully implicit numerical model based on the embedded discrete fracture model under an inner boundary condition of a constant gas production rate at a certain time step, to obtain a gas production, liquid production, grid block pressure and initial bottom-hole flow pressure of each fracture;

S3, establish a pressure drop model considering the gravity loss, frictional resistance loss and fracture convergence loss by combining the gas production, liquid production, and the pressure of the grid block where the fracture initiation point is located, to obtain a wellbore pressure variation of each fracturing section of the horizontal well;

S4, calculate the bottom-hole pressure of each fracture initiation point from the initial bottom-hole flow pressure and the wellbore pressure change of each fracturing section;

S5, perform the formation flow fully implicit numerical model based on the embedded discrete fracture model in step S2 by combining the bottom-hole flow pressure and the bottom-hole pressure of each fracture initiation point, and perform iterative cycles of the steps S2-S4 until the variables converge, to obtain the bottom-hole flow pressure and bottom-hole pressure at each fracture initiation point under this time step;

S6, bring the bottom-hole flow pressure and the total gas production and liquid production at the time step into the pressure drop model considering gravity loss and frictional resistance loss in the inclined section and vertical well section, to obtain wellbore pressure and wellhead casing pressure of each section through the iterative cycle at each section;

S7, for each time step, repeat steps S2-S6 to obtain the full wellbore pressure at different production times.

2. The full wellbore pressure calculation method of fracturing horizontal well according to claim 1, wherein establishment of the formation flow fully implicit numerical model based on the embedded discrete fracture model described in the step S1 comprises the following steps:

S11, establish a formation flow mathematical model based on the embedded discrete fracture model, in which the dual medium model is used to describe the flow exchange between the matrix and micro-fractures, and the embedded discrete fracture model is used to describe the flow exchange between the matrix and artificial fractures, based on mass conservation equation and Darcy's law to establish seepage differential equation, the formation flow mathematical model of the embedded discrete fracture model is as follows:

matrix system seepage equation:

$$\nabla \cdot \left(\frac{k_m k_{rlm}}{\mu_{lm} B_{lm}} \nabla p_{lm}\right) - q_{l,fm} = \frac{\partial}{\partial t}\left(\frac{\phi_m S_{lm}}{B_{lm}}\right) \quad (1)$$

micro-fracture system seepage equation:

$$\nabla \cdot \left(\frac{k_f k_{rlf}}{\mu_{lf} B_{lf}} \nabla p_{lf}\right) + q_{l,fm} - q_{l,Ff} = \frac{\partial}{\partial t}\left(\frac{\phi_f S_{lf}}{B_{lf}}\right) \quad (2)$$

artificial fracture system seepage equation:

$$\sum q_{l,F} + \sum q_{l,FF} + \sum q_{l,Ff} + q_{l,well} = \frac{\partial}{\partial t}\left(\frac{\phi_T S_{lF}}{B_{lF}}\right) \quad (3)$$

supplementary equation is as follows:

$$q_{l,fm} = \frac{\alpha k_m k_{rlm}}{\mu_{lm} \beta_{lm}}(p_{lm} - p_{lf}) \quad (4)$$

-continued $$q_{l,F} = G_F \frac{1}{\mu_{lF} \beta_{lF}}(p_{lF} - p_{lF})$$

$$q_{l,FF} = G_{FF} \frac{1}{\mu_{lF} \beta_{lF}}(p_{lm} - p_{lf})$$

$$q_{l,Ff} = G_{Ff} \frac{1}{\mu_{lf} \beta_{lf}}(p_{lf} - p_{lF})$$

$$q_{l,well} = G_{well} \frac{1}{\mu_{lf} \beta_{lf}}(p_{lF} - p_{wf})$$

wherein $k_m$ and $k_f$ represent the permeability of matrix, and micro-fracture, respectively, the unit is D; l=g or w, where g represents gas phase and w represents liquid phase; $k_{rlm}$ and $k_{rlf}$ represent the relative permeability of matrix, and micro-fracture, the unit is D; $\mu_{lm}$, $\mu_{lf}$, $\mu_{lF}$ represent the fluid viscosity of matrix, micro-fracture and artificial fracture system, the unit is Pa·s; $B_{lm}$, $B_{lf}$, $B_{lF}$ represent the fluid volume coefficients of the matrix, micro-fracture, and artificial fracture systems, respectively, dimensionless; $\varphi_m$, $\varphi_f$, $\varphi_F$ represent the porosity of the matrix, micro-fractures, and artificial fracture systems, respectively, dimensionless; $S_{lm}$, $S_{lf}$, $S_{lF}$ represent saturation, dimensionless; t represents production time, the unit is day; $p_{lm}$, $p_{lf}$, $p_{lF}$ represent the two-phase pressure of matrix, micro-fracture and artificial fracture system, the unit is MPa; $q_{l,fm}$ represents the flow exchange between matrix and micro-fractures based on the dual medium model, the unit is 1/day, wherein l=g,w; α represents the shape factor between matrix and micro-fractures, the unit is m$^{-2}$; $q_{l,F}$ represents the flow exchange between the grids after an artificial fracture is divided into multiple grids by the matrix grid, the unit is 1/day; $q_{l,FF}$ represents the flow exchange between different artificial fracture grids, the unit is 1/day; $q_{l,Ff}$ represents the flow exchange between the artificial fracture grid and the matrix grid, the unit is 1/day; $q_{l,well}$ represents the flow exchange between the artificial fracture grid and the connected well grid, the unit is 1/day; $G_F$ represents geometric parameters for the connection pairs of grids in the same fracture, dimensionless; $G_{FF}$ represents the geometric parameter of the connection pairs of intersected fracture grids between different fractures, dimensionless; $G_{Ff}$ is the geometric parameter of the connection pair between the matrix grid and intersected fracture grid, dimensionless; $G_{well}$ represents geometric parameters for connected pairs between fracture grid and intersected well grid, dimensionless;

S12, use a three-dimensional cubic grid to perform a space grid discretization for the reservoir, and based on the embedded discrete fracture model, the fracturing fractures are embedded in the three-dimensional cubic grid in a two-dimensional plane;

S13, using a finite difference method to establish the formation flow fully implicit numerical model based on the embedded discrete fracture model, comprising steps:

for the seepage equation (1) of the matrix system, the flow exchange relationship between the matrix grids on the left is written in the flow form:

$$\sum q_{l,mm} - q_{l,fm} = \frac{\partial}{\partial t}\left(\frac{\phi_m S_{lm}}{B_{lm}}\right) \quad (5)$$

in the formula: $q_{l,mm}$ is the flow exchange between connected matrix grids, the unit is 1/day;

the finite difference method is used to derive and expand the flow exchange term on the left of the above seepage equation, if there is a flow exchange between i and j grids, the fully implicit iterative form of the flow exchange between the two grids is:

$$q_{lij,mm}^{n+1} = a_{lmi}\delta p_{lmi} + a_{lmj}\delta p_{lmj} + b_{lmi}\delta S_{lmwi} + b_{lmj}\delta S_{lmwj} + d_{lmij} \quad (6)$$

in the formula: n+1 representing the next time step; $\delta p_{lmi}$, $\delta p_{lmj}$ representing the iterative pressure variables in the i-th and j-th grids of the matrix system; $a_{lmi}$, $a_{lmj}$ representing coefficients of iterative pressure variables in the i-th and j-th grids of the matrix system; $\delta S_{lmi}$, $\delta S_{lmj}$ representing the iterative saturation variable in the i-th and j-th grids of the matrix system; $b_{lmi}$, $b_{lmj}$ representing coefficients the iterative saturation variables in the i-th and j-th grids of the matrix system; $d_{lmij}$ representing the known quantity of flow exchange between the i-th and j-th grids of the matrix system;

the mass accumulation term on the right of the above seepage equation also derives and expands the unknowns, the coefficients of the unknowns are added to the coefficient matrix, and the known quantities are brought into the known quantity matrix to obtain:

$$mm \times \delta_m = d_m \quad (7)$$

in the formula: mm representing the coefficient matrix in the matrix flow equation; $\delta_m$ representing the unknown quantity matrix in the matrix flow equation; $d_m$ representing the matrix of known quantities in the matrix flow equation;

in the same way obtaining the coefficient matrix ff, FF, ww in the micro-fracture, artificial fracture and wellbore flow equation; the flow exchange coefficient matrix mf between the matrix and the micro-fracture system; the flow exchange coefficient matrix fF between the micro-fracture and the artificial fracture; flow exchange coefficient matrix Fw between artificial fracture and wellbore; known quantity matrix $d_f$, $d_F$, $d_w$ in micro-fracture, artificial fracture, and wellbore flow equation; unknown matrix $\delta f$, $\delta F$, $\delta w$ in micro-fractures, artificial fractures, and wellbore flow equations; establish a fully implicit solver matrix based on the finite difference method:

$$\begin{bmatrix} mm & mf & 0 & 0 \\ mf & ff & jF & 0 \\ 0 & jF & FF & Fw \\ 0 & 0 & Fw & ww \end{bmatrix} \begin{bmatrix} \delta m \\ \delta f \\ \delta F \\ \delta w \end{bmatrix} = \begin{bmatrix} d_m \\ d_f \\ d_F \\ d_w \end{bmatrix} \quad (8)$$

equation (8) is solved to obtain the gas production and liquid production of each fracture, the grid block pressure where each fracture is located, and the initial bottom-hole flow pressure.

3. The full wellbore pressure calculation method of fracturing horizontal well according to claim 2, it is characterized in that, the step S3 comprises the following steps:

S31, calculate apparent flow rates of gas and liquid at the initiation point of each fracture from the gas production and liquid production of each fracture, and combine the apparent flow rates of gas and liquid into the Mukherjee-Brill liquid holdup formula to calculate a liquid holdup at each fracture initiation point:

$$v_{sg} = q_{sc}B_g / A \quad (9)$$
$$v_{sl} = q_w B_w / A$$

wherein $v_{sl}$ represents the apparent flow rate of the liquid phase, the unit is m/s; $v_{sg}$ representing the apparent flow rate of the gas phase, the unit is m/s; $q_{sc}$ represents the fracture gas production, the unit m³/s; $q_w$ represents the fracture fluid production, the unit is m³/s; $B_g$ represents the volume coefficient of the gas phase, dimensionless; $B_w$ represents the liquid phase volume coefficient, dimensionless; A represents the cross-sectional area of the wellbore, the unit is m²;

$$H_l = \exp\left[\left(c_1 + c_2\sin\theta + c_3\sin^2\theta + c_4 N_l^2\right)\frac{N_{gv}^{c_5}}{N_{lv}^{c_6}}\right] \quad (10)$$

in the formula: $H_l$ represents the liquid holdup, dimensionless; $c_1=-0.380113$; $c_2=-0.129875$; $c_3=-0.119788$; $c_4=2.343227$; $c_5=0.475686$; $c_6=0.288657$; $\theta$ represents the angle between the wellbore and the horizontal direction, the unit is °;

the $N_{lv}$, $N_{gv}$, $N_l$ in the above formula are as follows:

$$\text{Liquid velocity number: } N_{lv} = v_{sl}\left(\frac{\rho_l}{G\delta}\right)^{1/4} \quad (11)$$

$$\text{Gas velocity number: } N_{gv} = v_{sg}\left(\frac{\rho_l}{G\delta}\right)^{1/4}$$

$$\text{Liquid viscosity number: } N_l = \mu_l\left(\frac{G}{\rho_l\delta^3}\right)^{1/4}$$

in the formula: $\rho_l$ represents the liquid density, the unit is kg/m³; $\delta$ represents the gas-liquid interfacial tension, the unit is N/m; $\mu_l$ repesents the liquid viscosity, the unit is Pa·s;

S32, calculate the density $\rho_m$ of the mixture, friction coefficient $f_m$ from the liquid holdup at each fracture initiation point and the grid block pressure, and the pressure gradient equation considering gravity loss, frictional resistance loss and fracture convergence loss is established as follows:

$$\frac{dp}{dL} = \rho_m G\sin\theta + f_m\frac{\rho_m v_m^2}{2D} + \rho_m v_m\frac{dv_m}{dL} \quad (12)$$

wherein dp/dL represents the pressure gradient, the unit is MPa/m; dL represents the length of the horizontal section between adjacent fractures, the unit is m; $\rho_m$ represents the mixed density, the unit is kg/m³; G represents the acceleration of gravity, the unit is m/s²; $\theta$ represents the angle between the wellbore and the horizontal direction; $f_m$ represents the two-phase friction coefficient, dimensionless; $v_m$ represents the mixing speed, the unit is m/s; D represents the diameter of the pipe, the unit is m;

S33, combine the pressure gradient equation (12) and the distance $\Delta L_i$ from the i-th fracture initiation point to the bottom-hole, to obtain the wellbore pressure changes in each fracturing section of the horizontal well as follows:

$$\Delta p_{wi} = \Delta L_i \cdot \frac{dp}{dL} (i = 2, 3, \ldots N_F) \quad (13)$$

in the formula: NF represents the total number of fractures; $\Delta L_i$ represents the distance from the i-th fracture initiation point to the bottom-hole of the well, the unit is m; $\Delta$pwi represents the horizontal wellbore pressure change from the bottom-hole to the i-th fracture, the unit is MPa.

4. A device for calculating the full wellbore pressure of a fracturing horizontal well, it is characterized in that, comprising:

processor, and acquisition module configured to acquire the initial data for calculating the full wellbore pressure of the fracturing horizontal well;

storage module having stored thereon a program operable on the processor for calculating the full wellbore pressure of a fracturing horizontal well, the program for calculating the full wellbore pressure of a fracturing horizontal well being processed by the processor implements the steps of the method according to any one of claims 1-3;

output module configured to output calculation results.

5. A non-transitory tangible computer readable storage medium, in which program code executable by a processor is stored, it is characterized in that, the computer readable storage medium comprises a plurality of instructions configured to cause the processor to perform the method for calculating the full wellbore pressure of a fractured horizontal well of any one of claims 1-3.

* * * * *